(12) United States Patent
Mayerhauser et al.

(10) Patent No.: US 6,663,467 B2
(45) Date of Patent: Dec. 16, 2003

(54) PROCESS AND COMPOSITION FOR ABRADING PRE-FINISHED SURFACES

(75) Inventors: George R. Mayerhauser, Ringwood, NJ (US); William J. Fernandez, Jr., East Brunswick, NJ (US); Michael T. Triolo, Pine Bush, NY (US); Robert P. DeHart, Edison, NJ (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 10/340,916

(22) Filed: Jan. 10, 2003

(65) Prior Publication Data

US 2003/0148708 A1 Aug. 7, 2003

Related U.S. Application Data

(60) Provisional application No. 60/348,075, filed on Jan. 10, 2002.

(51) Int. Cl.$^7$ .................................................. B24B 1/00
(52) U.S. Cl. ............................ 451/28; 451/36; 451/344; 451/350; 451/351; 451/352; 451/446; 51/303; 51/304; 51/308; 510/214; 510/217
(58) Field of Search ............................. 451/28, 36, 344, 451/350, 351, 352, 446; 51/303, 304, 308; 510/214, 217

(56) References Cited

U.S. PATENT DOCUMENTS

| | | | |
|---|---|---|---|
| 4,877,459 A | * | 10/1989 | Cockrell, Jr. et al. ......... 134/40 |
| 5,605,493 A | | 2/1997 | Donatelli et al. |
| 5,700,768 A | | 12/1997 | Lu |
| 5,709,589 A | | 1/1998 | Boone |
| 6,218,001 B1 | | 4/2001 | Chen et al. |
| 6,228,463 B1 | | 5/2001 | Chen et al. |
| 6,234,886 B1 | | 5/2001 | Rivard et al. |
| 6,291,078 B1 | | 9/2001 | Chen et al. |
| 6,521,535 B2 | * | 2/2003 | Sabia ......................... 438/691 |

* cited by examiner

*Primary Examiner*—Joseph J. Hail, III
*Assistant Examiner*—Shantese McDonald
(74) *Attorney, Agent, or Firm*—Vivien Y. Tsang; Robert E. McDonald; Arthi K. Tirey

(57) ABSTRACT

An abrading composition and a process for abrading factory pre-finished surface coverings, wherein the abrading composition comprises an effective amount of wear-resistant particles, a rheology modifier, and a solvent. This invention further relates to a process to abrade wood floor surfaces and factory pre-finished wood floor surfaces, as well as a process for refinishing a factory pre-finished wood floor using the abrading composition.

25 Claims, No Drawings

PROCESS AND COMPOSITION FOR ABRADING PRE-FINISHED SURFACES

CROSS-REFERENCE TO RELATED APPLICATION

This application claims the benefit of U.S. Provisional Application Ser. No. 60/348,075 filed Jan. 10, 2002.

BACKGROUND

Many surface coverings, such as pre-finished wood flooring, can contain a resilient, wear-resistant top coat. The top coat of pre-finished wood flooring can easily become scuffed, scraped, or marred when subjected to foot traffic and wear from anything that can come into contact with the top coat. As a result, the top coat deteriorates and becomes unsightly (e.g., dirty, scratched, difficult to clean, and susceptible to stains) and can also be partially or completely destroyed.

While efforts have been made to make more resilient surface coverings, especially in the flooring industry, such efforts have not solved the problem of refinishing the top coat surface of these wear-resistant surfaces. Pre-finished hardwood floors are a growing segment of the wood flooring industry. These floors have their finish applied in the factory as opposed to the traditional method of having a contractor finish the floor on-site after installation. Pre-finished flooring manufacturers, as a means of giving their product a competitive advantage over traditional wood floors finished on site, have incorporated wear-resistant particles, like aluminum oxide, into these factory applied finishes. Generally, although the aluminum oxide in the finish allows for pre-finished floor manufacturers to provide up to 25 year wear-through warranties, these warranties are limited to wear-through only, and does not cover the everyday scuffing, scraping, marring, scratching, etc. Problems of scuffing, scraping, marring, and scratching still occur, necessitating recoating of the floors to achieve a uniform nice appearance again. In order to facilitate the adhesion of the new topcoat, the existing surface needs to be roughed up to give the new coat "bite". For conventional wood floor refinishing, buffing machines are typically used with buffing pads and screens adhered to the buffing face. The screens are coated with an abrasive that function to abrade the floor surface, after which the resulting powdered material is picked up with a damp cloth before recoating. In the case of pre-finished wood floors, however, the buffing process quickly damages the screens due to the action of the wear-resistant particles embedded in the factory applied film which chews up the screen, rendering it useless. This, in turn, has required the constant replacement of screens when trying to abrade factory pre-finished wear-resistant floors.

It has now been discovered that a new composition and process can be used to abrade surface coverings for refinishing, especially factory pre-finished wood floors that have a resilient coating layer incorporating wear-resistant particles such as aluminum oxide.

SUMMARY OF THE INVENTION

The present invention is an abrading composition and a process for abrading surface coverings, wherein the abrading composition comprises (a) an effective amount of wear-resistant particles; (b) about 50% by weight to about 99% by weight of a solvent based on the total weight of the composition; and (c) about 0.10% by weight to about 10.0% by weight of a rheology modifier based on the total weight of the composition. The surface covering comprises at least one layer of a wear-resistant coating. This invention further relates to a process to abrade wood floor surfaces and factory pre-finished wood floor surfaces, as well as a process for refinishing a factory pre-finished wood floor using the abrading composition.

DETAILED DESCRIPTION OF THE INVENTION

This invention is a composition and method for refinishing surface coverings with resilient wear-resistant top coats. This invention is also directed to a composition and method for refinishing factory pre-finished wood flooring. Generally, for typical hardwood flooring, it has been standard practice to screen the wood floors prior to applying the finish coats. However, the principal difficulty of refinishing factory pre-finished wood flooring is the ability to abrade the topcoat surface without ruining the screen. It is believed that the wear-resistant particles (i.e., aluminum oxide particles) present in the factory pre-finished wood flooring damage the buffer screen quicker than the floor is being abraded. Wear-resistant particles that are used in factory pre-finished wood flooring include, but are not limited to, aluminum oxide, carborundum, quartz, silica (sand), glass particles, glass beads, glass spheres (hollow and/or filled), plastic grits, silicon carbide, diamond dust (glass), hard plastics, reinforced polymers, organics, and the like, or mixtures thereof Accordingly, the abrading composition of this invention comprises (a) wear-resistant particles; (b) a rheology modifier; and (c) a solvent such as mineral spirits or water. According to this invention, preferred wear-resistant particles are silicon carbide particles. Other wear-resistant particles include, but are not limited to, carborundum, quartz, silica (sand), glass particles, glass beads, glass spheres (hollow and/or filled), plastic grits, aluminum oxide, diamond dust (glass), hard plastics, reinforced polymers, organics, and the like. One or a combination of two or more of the wear-resistant particles can be used in the abrading composition. The wear-resistant particles are present in the abrading composition in an amount effective to dull the finish of the pre-finished surface when rubbed in a circular motion. Preferably, the wear-resistant particles can be present in the composition between about 5% by weight to about 50% by weight, based on the total weight of the abrading composition.

While any source of wear-resistant particles can be used, it is preferred that the particle size of the wear-resistant particles is from about 10 microns to about 350 microns, and more preferably from about 20 microns to about 200 microns. Silicon carbide, in particular, can be obtained from the following sources: Washington Mills, N. Grafton, Mass.; Composition Materials, Fairfield, Conn.; and Micro Abrasives, Westfield, Mass.

A major constituent of the abrading composition is the solvent. The solvent is preferably water or mineral spirits, which can be present in amounts in excess of 50% by weight, based on the total weight of the abrading composition.

In order to overcome the potential difficulty of maintaining wear-resistant particles in a suspension, a rheology modifier is used to prevent the settling of the composition. Preferably, the rheology modifier is an inorganic thickener such as organoclays (organically modified laminar silicates) exemplified by, but not limited to, hectorite, bentonite, and synthetic amorphous silicates; organic thickeners for aqueous systems such as associative acrylic thickeners known as hydrophobically modified alkali swellable emulsions; hydrophobically modified ethoxylated urethane block copolymers; non acrylic associative thickeners such as hydrophobically modified vinyl copolymer; cellulose ethers such as cellulose derivatives such as, but not limited to, hydroxymethyl cellulose; and organic thickeners for solvent based systems such as hydrogenated castor oil, polyamides, overbased sulphonates, and polyolefins. Any combinations or mixtures of various rheology modifiers can be used. Specific examples of such polymers include, but are not limited to, Bentone from Elementis/Rheox Inc, Tixogel from Sud-Chemie GmbH, Stabileze QM from ISP Technologies, Inc., Carbopol from Noveon Inc, RM-825 from Rohm & Haas Company, SER-AD FX 1010 from CONDEA Servo, SER-AD FX 2050 from CONDEA Servo, Irgagel from Lubrizol, Inc, and Diparlon A670-20M from King Industries Inc. Generally, the rheology modifier is present in an amount sufficient to suspend the wear-resistant particles in the liquid medium for a period of time so as to minimize the frequency of shaking the container for dispersing the abrasive. Typically, the amount of the rheology modifier present is an amount of from about 0.1% by weight to about 10% by weight, based on the weight of the abrading composition.

Optionally, the abrading composition can also incorporate preservatives for water-based compositions, fragrances, and the like, to the extent that such incorporation does not impair the intended effects of the abrading composition.

The abrading composition can be applied to the floor in any suitable manner, such as from a spray pump bottle or a squeeze bottle, or any other typical wet application methods. A user can apply the composition to an area of floor and then either hand abrade with a pad in circular motion, or go over it with the rotary buffing machine having a buffing pad. If a rotary buffing machine is utilized, it is preferred that the buffing pad further comprise a covering or sheet overlay made of an impervious material. For example, a 20 mil thick vinyl sheet can be cut to match the size of the buffing pad and can then be attached to the pad by means of Velcro® (trademark of Velcro Industries) strips. The buffing pad, due to its flexibility and "padding" ability, will not disintegrate as typical screens do on aluminum oxide floors. And preferably, the vinyl sheet will allow the abrasive to remain in good contact with the floor surface. The wear-resistant particles, such as silicon carbide in the solution, provides the abrasiveness to roughen the floor in conjunction with the downward force from the weight of the rotary buffer. Afterwards, a user can tack (wipe up) the powdered film and the used wear-resistant particles from the solution as they normally would to remove all the dust prior to applying a new coat of finish. Any wood floor finish can be applied as usual.

The present invention will be further explained with reference to the following examples, without limit thereto.

EXAMPLES

Example 1

A one gram sample of a composition comprising 80 percent by weight mineral spirits and 20 percent by weight 220 grit aluminum oxide (average particle size of about 57 microns) (3M, Washington Mills) is applied to a 2¾"×2½" piece of pre-finished flooring (Mirage Engineered™ Alumix® advanced polyurethane finishing system, from Boa-Franc, Inc., Quebec, Canada). The sample is shaken prior to application until the aluminum oxide is dispersed. The suspension is rubbed on the piece of flooring with a paper towel for 15 seconds with a circular motion by hand, the excess material is wiped off with a paper towel that is premoistened with water. The resulting piece of pre-finished flooring is visually dulled where the rubbing occurred, but remains the same at the edges where no rubbing occurred. This dulling shows where abrasion of the polyurethane film has occurred from the addition of aluminum oxide.

Example 2

Samples of calcined alumina (aluminum oxide) (Alcoa), A2-325 and A13-325 are prepared and treated in the same manner as Example 1. Time gloss readings are taken prior to application of the material. For the A2-325 sample, initial 60° gloss is 29.5, and after application, the gloss is 18.7. Visual dulling can be observed, though not as much as when using the 3M 220 grit material. For the A13-325 sample, initial gloss is 32.2, and after application gloss is 56.2, indicating a polishing effect, not a dulling effect. Both calcined aluminas are much finer than the 220 grit material, hence their reduction in abrasive ability. These calcined aluminas have smaller particle sizes (90–95%) and will not pass through a mesh opening of 44 microns.

Example 3

All three materials (220 grit, calcined alumina A2-325, calcined alumina A13-325) are applied to a strip of polyurethane coated pre-finished board not containing aluminum oxide in the finish in the same manner and amounts as in Example 1 above. The most abrasion occurs with the Boa-Franc material with the 3M® 220 grit material, some abrasion occurred with the calcined A2-325 (Alcoa), and none with the calcined A13-325 (Alcoa). The 220 grit material area distinctly dulled and was readily apparent.

Example 4

Samples of various grits (120–180) of silicon carbide (Washington Mills), Silicaride, are prepared similarly to Example 1 except that a rheology modifier is used to suspend the abrasive particles. These samples are applied to the floor and then the rotary buffing machine with a buffing pad with a vinyl sheet are applied over the solution by the operator as would normally occur when screening or padding a floor. Upon tacking the floor after running the machine, the floor (Capella-Mill Run by Anderson-Tully) is distinctly dulled to the naked eye, thus indicating abrasion has taken place.

While the invention has been described with respect to certain embodiments, it will be appreciated that many modifications and changes may be made by those skilled in the art without departing from the spirit of the invention.

What is claimed is:

1. An abrading composition for abrading surface coverings, comprising:
 a) an effective amount of wear-resistant particles;
 b) about 50% by weight to about 99% by weight of a solvent based on the total weight of the composition;
 c) about 0.10% by weight to about 10.0% by weight of a rheology modifier based on the total weight of the composition;
wherein the surface covering comprises at least one layer of a wear-resistant coating.

2. The composition of claim 1, wherein the wear-resistant particles are present at about 5% by weight to about 50% by weight, based on the weight of the composition.

3. The composition of claim 1, wherein the wear-resistant particles can be selected from the group consisting of silicon carbide, aluminum oxide, carborundum, quartz, silica (sand), glass particles, glass beads, glass spheres (hollow and/or filled), plastic grits, diamond dust (glass), hard plastics, reinforced polymers, organics, and the like, or mixtures thereof.

4. The composition of claim 1, wherein the wear-resistant particles are aluminum oxide particles having a grit size of greater than 200.

5. The composition of claim 1, wherein the wear-resistant particles are silicon carbide particles having a grit size of greater than 100.

6. The composition of claim 1 wherein the surface covering can be selected from the group consisting of pre-finished wood flooring, stone flooring, and countertops.

7. The composition of claim 1, wherein the solvent can be selected from the group consisting of water or mineral spirits.

8. The composition of claim 1, wherein the rheology modifier can be selected from the group consisting of organoclays, associative acrylic thickeners such as hydrophobically modified alkali swellable emulsions, hydrophobically modified ethoxylated urethane block copolymers, non acrylic associative thickeners such as crosslinked hydrophobically modified vinyl copolymer, cellulose ethers such as hydroxymethyl cellulose, hydrogenated castor oil, polyamides, overbased sulphonates, and polyolefins.

9. A process for abrading a wood floor surface comprising:
   a) applying to the floor an abrading composition comprising
      i) an effective amount of wear-resistant particles;
      ii) about 50% by weight to about 99% by weight of solvent, based on the total weight of the composition;
      iii) about 0.10% by weight to about 10.0% by weight of a rheology modifier, based on the total weight of the composition;
   b) optionally subjecting the wood floor surface to the action of a rotary buffing machine; and
   c) buffing the wood floor with the abrading composition and a buffing pad.

10. The process of claim 9, wherein the buffing pad of the rotary buffing machine further comprises a covering or sheet overlay made of an impervious material.

11. The process of claim 10, wherein the impervious covering is a vinyl sheet.

12. The process of claim 10, wherein the impervious covering is a vinyl sheet.

13. The process of claim 9 wherein the wood floor surface is a pre-finished wood floor.

14. The process of claim 9 wherein the wood floor comprises at least one coating layer comprising wear-resistant particles.

15. The process of claim 9 wherein the wear-resistant particles can be selected from the group consisting of aluminum oxide, carborundum, quartz, silica (sand), glass particles, glass beads, glass spheres (hollow and/or filled), plastic grits, silicon carbide, diamond dust (glass), hard plastics, reinforced polymers, organics, or mixtures thereof.

16. The process of claim 9 wherein the wear-resistant particles are present at about 5% by weight to about 50% by weight, based on the weight of the composition.

17. The process of claim 16 wherein the wood floor surface is a pre-finished wood floor.

18. The process of claim 16 wherein the pre-finished wood floor comprises at least one layer comprising the wear-resistant particles.

19. The process of claim 16 wherein the wear-resistant particles can be selected from the group consisting of aluminum oxide, carborundum, quartz, silica (sand), glass particles, glass beads, glass spheres (hollow and/or filled), plastic grits, silicon carbide, diamond dust (glass), hard plastics, reinforced polymers, organics, or mixtures thereof.

20. The process of claim 16 wherein the wear-resistant particles can be selected from the group consisting of aluminum oxide, carborundum, quartz, silica (sand), glass particles, glass beads, glass spheres (hollow and/or filled), plastic grits, silicon carbide, diamond dust (glass), hard plastics, reinforced polymers, organics, or mixtures thereof.

21. The process of claim 16 wherein the wear-resistant particles are present at about 5% by weight to about 50% by weight, based on the weight of the composition.

22. The process of claim 16 wherein the solvent can be selected from the group consisting of water or mineral spirits.

23. The process of claim 9 wherein the solvent can be selected from the group consisting of water or mineral spirits.

24. The process of claim 9, wherein the buffing pad of the rotary buffing machine further comprises a covering or sheet overlay made of an impervious material.

25. A process for finishing a pre-finished wood floor comprising:
   a) applying to the pre-finished wood floor an abrading composition comprising an effective amount of wear-resistant particles;
      i) about 50% by weight to about 99% by weight of a solvent based on the total weight of the composition;
      ii) about 0.10% by weight to about 10.0% by weight of a rheology modifier, based on the total weight of the composition;
   b) subjecting the pre-finished wood floor surface to the action of a rotary buffing machine and a buffing pad with the abrading composition;
   c) wiping the wood floor surface to remove all dust; and
   d) applying a coat of a wood floor finish.

* * * * *